United States Patent [19]

Takanashi et al.

[11] Patent Number: 4,959,722
[45] Date of Patent: Sep. 25, 1990

[54] IMAGE PICKUP DEVICE USING A PHOTO-TO-PHOTO CONVERSION ELEMENT

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka, all of Japan

[73] Assignee: Victor Company of Japan, Ltd., Yokohama, Japan

[21] Appl. No.: 301,188

[22] Filed: Jan. 24, 1989

Related U.S. Application Data

[63] Continuation-in-part of Ser. No. 139,005, Dec. 29, 1987, Pat. No. 4,831,452.

[30] Foreign Application Priority Data

Jan. 25, 1988 [JP] Japan .................................. 63-13944

[51] Int. Cl.$^5$ ............................................... H04N 5/30
[52] U.S. Cl. ............................... 358/211; 250/213 VT
[58] Field of Search ...................... 358/211, 217–219; 250/214 VT

[56] References Cited

U.S. PATENT DOCUMENTS

| | | | |
|---|---|---|---|
| 2,929,866 | 3/1960 | Melamed | 358/211 |
| 3,577,200 | 5/1971 | Aldrich et al. | 178/7.1 |
| 3,716,747 | 2/1973 | Patel | 315/10 |
| 3,865,975 | 2/1975 | Fletcher et al. | 178/7.1 |
| 4,641,193 | 2/1987 | Glenn | 358/233 |
| 4,727,427 | 2/1988 | Kime | 358/217 |

OTHER PUBLICATIONS

O Plus E, No. 86, Jan. 1, 1987, Published by Shingijutsu Communications, Inc., Japan.

*Primary Examiner*—Stephen Brinich
*Attorney, Agent, or Firm*—Michael N. Meller

[57] ABSTRACT

There is provided an image pickup device having a high resolution used for a movie camera, a still camera (shutter) camera) and the like. This image pickup divice includes a photo-to-photo conversion element (PPCE) comprising at least a photoconductive layer member, a dielectric mirror and an optical modulation layer member disposed between two transparent electrodes, a first image formation elements for forming an optical image of an object on said photo-to-photo conversion element, a second image formation elements for scanning, in two direction substantially perpendicular to each other, optical image information corresponding to said optical image of said object using a light from said photo-to-photo conversion element to read it out, and for changing the light beam reading out said optical image information to a scanning light beam, a canning locus of which on a plane becomes a line, and recording medium transportation mechanism for allowing a recording surface of a recording medium to be located on said plane where a linear image of said optical information is formed, and for continuously moving said recording medium in a direction having an angle with respect to said line of the scanning locus.

3 Claims, 1 Drawing Sheet

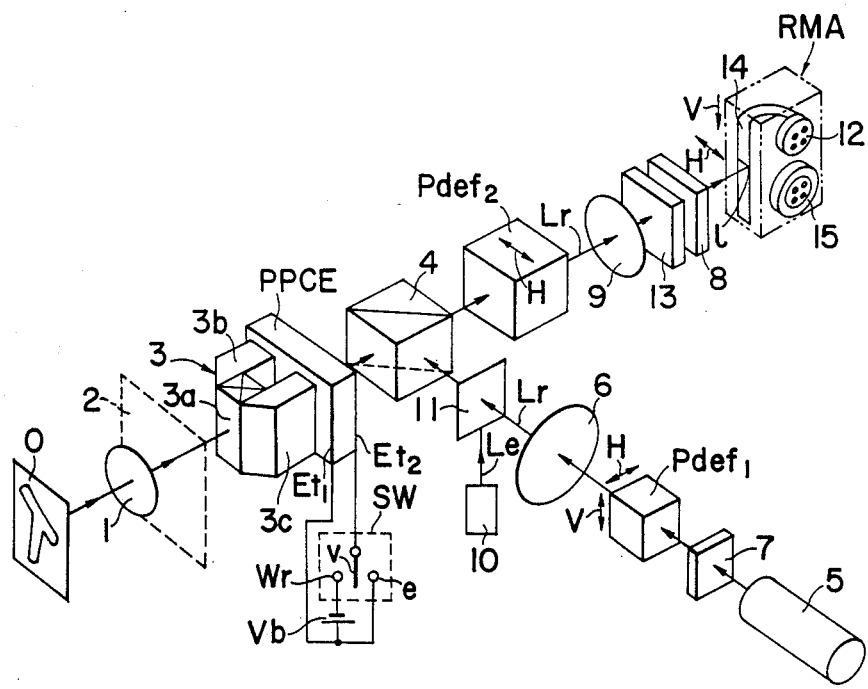
F I G. 1
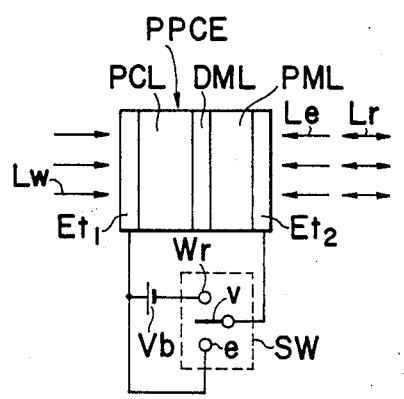
F I G. 2
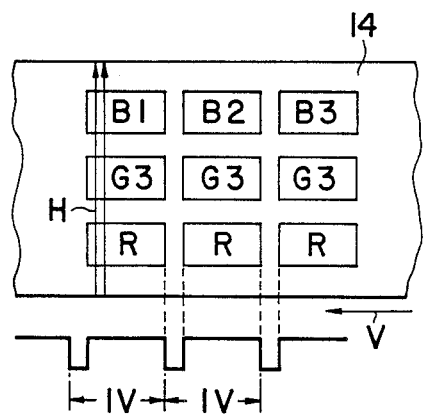
F I G. 3

IMAGE PICKUP DEVICE USING A PHOTO-TO-PHOTO CONVERSION ELEMENT

This is a continuation-in-part application of application Ser. No. 139,005 filed Dec. 29, 1987 now U.S. Pat. No. 4,831,452 issued May 16, 1989.

BACKGROUND OF THE INVENTION

This invention relates to an image pickup device used for a movie camera, a still camera (shutter camera) and the like, and more particularly to an image pickup device having a high resolution.

A video signal which is obtained by picking up an optical image of an object on an image pickup device can be easily subjected to editing, trimming and any other video signal processing. In addition, such a video signal can be easily recorded and reproduced using a reversible recording medium capable of erasing a recorded signal. On the other hand, image pickup devices conventionally used for generation of the video signal have such an arrangement to convert an optical image of an object formed on a photoelectric conversion area of an imaging element by use of an imaging lens to electrical image information corresponding to the optical image of the object at the photoelectric conversion area of the imaging element to sequentially output such an electrical pictorial image information on a time base as the video signal. As is well known, various kinds of pickup tubes and various kinds of solid state image sensors are used as the imaging element of the image pickup device.

Recently, there is much demand to reproduce a picture with both picture quality and resolution considerably higher than those of the currently utilized television systems. In accordance with such a demand, novel systems, e.g., the so-called Extended Definition Television (EDTV) and High Definition Television (HDTV) systems, etc. have been proposed for this purpose.

In order to obtain a picture of high picture quality and high resolution, an image pickup device capable of generating such a video signal to permit a reproduction of the picture with high picture quality and high resolution is required. In the case of the image pickup device which uses a pickup tube as the imaging element, however, the realization of the high resolution by reducing the electron beam diameter cannot be expected because there is a limitation for reducing a diameter of an electron beam in the image pickup tube. Further, since a target capacity of the pickup tube increases with the target area, the realization of high resolution due to an increase in the target area is impossible. Furthermore, in the case of the image pickup device for use in taking moving pictures, a frequency range of the video signal becomes several tens of MHz to several hundreds of MHz and this causes problems in view of the S/N ratio. For these reasons, it is difficult to generate a video signal which enables the reproduction of pictures with high picture quality and high resolution by using the above-mentioned image pickup device.

The above-described problems will be described in an actual sense. Namely, in order to generate such a video signal capable of reproducing a picture with the high picture quality and high resolution by means of an image pickup device using an image pickup tube as the imaging element, it is conceivable to reduce the diameter of the electron beam of the image pickup tube, or to use a target having a large area. However, since there is a limitation in reduction of the diameter of the electron beam of the image pickup tube due to the performance of an electron gun of the image pickup tube and the structure of the convergence system, there is a limitation in the realization of the high resolution due to reduction of the diameter of the electron beam. Moreover, when an attempt is made to use an imaging lens having a large pickup image size to provide a high resolution by increasing the area of the target, the high frequency signal component of an output signal from the image pickup tube is lowered due to an increase in the target capacity of the image pickup tube caused by increasing the target area, resulting in a considerably lowered S/N ratio for the image pickup tube. Thus, some image pickup devices using image pickup tubes are unable to satisfactorily generate video signals that can reproduce pictures with the high picture quality and high resolution.

On the other hand, for reproducing a picture of high picture quality and high resolution by means of an image pickup device using a solid state image sensor as the imaging element, it is required to use a solid state sensor having a large number of pixels. However, a clock signal which drives the solid state image sensor having the large number of picture elements naturally requires a high frequency. For example, in the case of image pickup devices for use in taking moving pictures, the clock signal for driving the solid state image sensor has a high frequency in the order of several hundreds of MHz. In addition, an electrostatic capacitance of the associated circuit which is driven increases as the number of picture elements increases. Since an upper limit of the frequency of the clock signal for driving the solid state image sensor is presently believed to be approximately 20 MHz, it is virtually impossible from a practical point of view to use such a solid state image sensor as the imaging element.

As has been described above, in the conventional image pickup device, it is impossible to satisfactorily generate a video signal which gives a reproduced picture with high picture quality and high resolution, due to the limitations of the imaging element indispensable for constituting that image pickup device.

In view of this, the assignee has already proposed, as an image pickup device capable of solving the above-described problems, an image pickup device including a photo-to-photo conversion element comprising at least a photoconductive layer member, a dielectric mirror and an optical modulation layer member which are disposed between two transparent electrodes, to therefore form an optical image of an object on the photo-to-photo conversion element by an imaging lens to read out, by using light, from the photo-to-photo conversion element, optical image information corresponding to an optical image of the object to record it on a storage member.

However, in the case of memorizing, on the storage member as a two-dimensional configuration, optical information corresponding to the optical image of the object which has been read out using light from the photo-to-photo conversion element, the storage member must be transported by an intermittent drive like a transportation or carrier mechanism for an ordinary movie film. Thus, the carrier mechanism for storage member becomes complicated, resulting in the requirement to take countermeasures therefor.

SUMMARY OF THE INVENTION

Accordingly, an object of this invention is to provide an image pickup device capable of simplifying the transportation mechanism for the storage member.

In accordance with this invention, there is provided an image pickup device comprising a photo-to-photo conversion element two image formers and a recording medium transporter. The photo-to-photo conversion element has at least a photoconductive layer member, a dielectric mirror, and an optical modulation layer member which are disposed between two transparent electrodes. The first image former forms an optical image of an object on the photo-to-photo conversion element. The second image former scans in two directions substantially perpendicular to each other, optical image information corresponding to the optical image of the object using a light from the photo-to-photo conversion element to read it out, and changes the light beam reading out the optical image information to a scanning light beam, a scanning locus of which on a plane becomes a line. The recording medium transporter allows a recording surface of a recording medium to be located on the plane where a linear image of the optical information is formed, and for continuously moves the recording medium in a direction having an angle with respect to the line of the scanning locus.

In the image pickup device of this invention, even in the case of memorizing, on the storage member as a two-dimensional configuration, optical information corresponding to an optical image of an object having been read out using light from the photo-to-photo conversion element, a transportation mechanism of a simple structure to successively transport the storage member at a constant speed in one direction can be used. There is no need to adopt a complicated mechanism to transport the recording medium by the intermittent drive as in the prior art.

Accordingly, this invention can provide an image pickup device capable of reading out and recording high accuracy information, and capable of picking up a reproduced image of high resolution which can satisfactorily solve the problems with the prior art.

BRIEF DESCRIPTION OF THE DRAWINGS

In the accompanying drawings:

FIG. 1 is a perspective view showing, in block form, a schematic configuration of an embodiment of an image pickup device according to this invention;

FIG. 2 is a side cross sectional view for explaining the structural principle of the photo-to-photo conversion element used in the arrangement of the image pickup device of this invention; and FIG. 3 is a plan view of an example showing a pattern recorded on the recording medium by the image pickup device of this invention.

DESCRIPTION OF THE PREFERRED EMBODIMENT

An embodiment of an image pickup device according to this invention will be described in detail with reference to the drawings.

In FIG. 1, an optical image from an object 1 is delivered to a photo-to-photo conversion element PPCE through an imaging lens 1, an optical shutter 2 provided when the image pickup device is constructed as a shutter camera, a three-color separation optical system 3 used when the image pickup device is implemented as a color image pickup device and having an optical block 3a of the dichroic mirror, and optical blocks 3b and 3c for adjustment of an optical path length. The lens 1 and the three color separation optical system are disclosed in detail in Japanese Patent Application No. 226137/87. A light source 5 for a reading light is used in reading out optical image information from the photo-to-photo conversion element PPCE. For this light source 5, a laser light source or any other light source may be used. It is now assumed that there is no possibility that the diameter of a beam produced from the light source 5 is widened on the extension thereof and is smaller than the size of the minimum pixel on the PPCE. A light beam produced from the light source 5 is polarized by a polarizing plate 7. Thus, the beam of light delivered is deflected in the longitudinal and lateral directions (indicated by arrow V and H in the figure) by a light deflector $Pdef_1$ to produce a quasi-multibeam light, which means in this specification a single beam passing through multiple paths to form a television raster with the lapse of time. Further, the beam is deflected in the longitudinal and lateral directions by the light deflector $Pdef_1$ so that the quasi-multibeams fan out toward a collimator lens 6 by which the multibeams are changed to parallel beams. In the case of a light source capable of emitting light having a predetermined single wavelength, the polarizing plate 7 is unnecessary.

A beam splitter 11 is provided on the optical axis of the collimator lens 6 so as to make an angle of 45 degrees and an erasing light Le from the light source 10 is applied to the beam splitter 11.

The optical image of the object 0 formed on the PPCE is passed through a beam splitter 4 having a function of allowing a reading light from the light source 5 to be incident to the PPCE and is then deflected by a light deflector $Pdef_2$ in the lateral direction (indicated by the arrow H in FIG. 1). The read-out beam which has been changed to a parallel light by the deflection is converged by an imaging lens 9. Thus, an image is formed on the recording surface of a recording medium 14. A wave plate 13 and an analyzer 8 are interposed between the imaging lens 9 and the recording surface.

The recording medium 14 is wound onto a supply reel 12 within a recording unit RMA, and is continuously transported at a constant transportation speed in a certain direction (indicated by the arrow V in FIGS. 1 and 3) toward a take-up reel 15. Because such a continuous movement means for a recording medium is well known, the detail thereof is omitted here.

In the image pickup device shown in FIG. 1, an optical image of the object 0 is given as, e.g., three optical images based on three primary colors of Red, Green and Blue, to photo-to-photo conversion element PPCE through imaging lens 1 and three color separation optical system 3. When the image pickup device is constructed as a shutter camera, an optical image of the object 0 is formed on the photo-to-photo conversion element PPCE by the imaging lens 1 with the optical shutter 2 being open.

For the photo-to-photo conversion element PPCE, for example, a liquid crystal optical modulator, a photoconductive Pockels cell, a spatial high modulator element such as a microchannel light modulator, an element constituted by a photochromic material and the like may be used. In addition, photo-to-photo conversion elements PPCE having a storage function and ones having no storage function may be selectively used depending upon the purpose of use.

FIG. 2 is a side cross sectional view showing the structural principle of the photo-to-photo conversion element PPCE. The photo-to-photo conversion element PPCE shown in FIG. 2 includes transparent electrodes $Et_1$ and $Et_2$, a photoconductive layer member PCL, a dielectric mirror DML (having such a wavelength selectivity to transmit a writing light and an erasing light and to reflect a reading light), and a light modulation layer member PML such as lithium niobate ($LiNbO_3$) single crystal, wherein Lw, Lr and Le denote a writing light, a reading light and an erasing light, respectively. The photo-to-photo conversion element PPCE further comprises a power supply Vb and a changeover switch SW. The changeover switch SW is operative so that when writing light Lw and/or reading light Lr are incident to the photo-to-photo conversion element PPCE, its movable contact v is switched to the fixed contact wr side, and when erasing light Le is incident to the photo-to-photo conversion element PPCE, its movable contact v is switched to the fixed contact e side.

Under the condition where a voltage of the power supply Vb is applied to transparent electrodes $Et_1$ and $Et_2$ in the photo-to-photo conversion element PPCE through movable contact v and fixed contact wr, when writing light Lw corresponding to an optical image of the object is transmitted through the transparent electrode $Et_1$ of the photo-to-photo conversion element PPCE and is then incident to the photoconductive layer member PCL, the electrical resistance value of the photoconductive layer member PCL changes in correspondence with an optical image of the object incident thereto.

Thus, a charge image corresponding to the optical image of the object occurs at the boundary portion between the photoconductive layer member PCL and the dielectric mirror DML. Under the condition where the transparent electrodes $Et_1$ and $Et_2$ in the photo-to-photo conversion element PPCE are maintained at the same potential through the movable contact v and the fixed contact e of the switch SW, erasing light Le is incident from the transparent electrode $Et_2$ side of the photo-to-photo conversion element PPCE, thereby making it possible to erase such a charge image.

Namely, in the erase mode, when erasing light Le incident from the transparent electrode $Et_2$ side of the photo-to-photo conversion element PPCE is transmitted through the optical modulation layer member MPL and the dielectric mirror (having such a wavelength selectivity to transmit writing light and erasing light and to reflect reading light) and is then incident to the photoconductive layer member PCL, the electrical resistance value of the photoconductive layer member PCL is lowered by the erasing light Le, so that a charge image at the boundary portion between the photoconductive layer member PCL and the dielectric mirror DML is erased.

Furthermore, the charge image corresponding to an optical image of the object which has occurred at the boundary portion between the photoconductive layer member PCL and the dielectric mirror DML can be read out as an optical image from the transparent electrode $Et_2$ side of the photo-to-photo conversion element PPCE by making reading light Lr incident from the transparent electrode $Et_2$ of the photo-to-photo conversion element PPCE under the condition where a voltage of the power supply Vb is applied to the transparent electrodes $Et_1$ and $Et_2$ of the photo-to-photo conversion element PPCE through the movable contact v and the fixed contact wr of the switch SW.

Namely, reading light Lr incident from the transparent electrode $Et_2$ side of the photo-to-photo conversion element PPCE in the reading mode is transmitted through the optical modulation layer member PML to reach the dielectric mirror (having wavelength selectivity so as to transmit writing light and erasing light and to reflect reading light) DML, at which it is reflected and then transmitted through the optical modulation layer member PML for a second time. Thus, it is emitted from the transparent electrode $Et_2$ side of the photo-to-photo conversion element PPCE. The reading light which has been emitted from the transparent electrode $Et_2$ side of the photo-to-photo conversion element PPCE after having passed through and back through the optical modulation layer member PML in the manner stated above, is such that its polarization surface is changed by an electric field due to a charge image corresponding to an optical image of the object which has occurred at the boundary portion between the photoconductive layer member PCL and the dielectric mirror DML as previously described. Therefore, by passing its emission light through the analyzer, the light emitted from the analyzer becomes an optical image indicating the same change in light quantity as that of the optical image of the object.

When a single wavelength light is used, a reproduced image having a sufficiently high resolution can be obtained.

In the image pickup device shown in FIG. 1, writing light Lw on the basis of the optical image of the object O incident to the transparent electrode $Et_1$ side of the photo-to-photo conversion element PPCE by way of the imaging lens 1, is converted to a charge image at the boundary portion between the photoconductive layer PCL and the dielectric mirror DML of the photo-to-photo conversion element PPCE. In the case where a single wavelength light is used as the reading light, the charge image is emitted from the photo-to-photo conversion element PPCE as single wavelength information of which the contents correspond to those of the optical image of the object.

In the color image pickup device shown in FIG. 1, after the light radiated from the light source 5 is subjected to linear polarization having a specified polarized surface by the polarizer 7, the reading light Lr of the single wavelength light is deflected by light deflector $Pdef_1$ in two directions perpendicular to each other indicated by arrows H and V in FIG. 1 and is then incident to the collimator lens 6.

Then, the parallel light emitted from the collimator lens 6 is transmitted through the beam splitter 11 and is then incident to the beam splitter 4. The incident light is reflected by the beam splitter 4 toward the photo-to-photo conversion element PPCE and is then incident to the transparent electrode $Et_2$ side of the photo-to-photo conversion element PPCE.

The light emitted from the photo-to-photo conversion element PPCE is single wavelength light information whose contents correspond to those of the optical image of the object as having been described with reference to FIG. 2. That light is transmitted through the beam splitter 4 and is then incident to the light deflector $Pdef_2$. In the light deflector $Pdef_2$, the light beam incident thereto is deflected only in the lateral direction as indicated by the arrow H in FIG. 1. The reason why the optical deflector Pdef$_2$ exists is as follows. In the case where quasi-multi beams incident to the photo-to-photo conversion element PPCE are parallel to each other, if such multi beams are transmitted through the lens 9 with the optical deflector being absent, all scanning beams read out are focused on one point on the recording medium 14. For this reason, the deflector Pdef$_2$ is used to deflect that light in the H direction to scan it in the H direction on the recording medium 14.

The light beam emitted from the photo deflector Pdef$_2$ is subjected to image formation on the recording surface of the recording medium 14 by the imaging lens 9. Since the reading light Lr incident to the photo-to-photo conversion element PPCE is the light beam made parallel to the light axis by the collimator lens 6 as described above, the light beam emitted from the photo-to-photo conversion element PPCE is also parallel to the optical axis. Accordingly, the light point which has been subjected to image formation by the imaging lens 9 depicts a lateral linear locus as indicated by l in FIG. 1.

Accordingly, the recording surface is positioned on the image formation surface of the imaging lens. Thus, required information is recorded by successive lines as shown in FIG. 3 on the recording medium 14 successively transported in a direction perpendicular to the linear locus of the light point (in the direction indicated by V in FIGS. 1 and 3).

FIG. 3 shows an embodiment of a pictorial image recorded on the recording medium 14 in the case of the example shown in FIG. 1. Square frames R, G and B shown in FIG. 3 represent respective primary color images R, G and B of the three primary colors. The respective primary color images R, G and B are arranged in the direction H perpendicular to the transportation direction (arrow V) of the recording medium 14 and are also arranged in the direction of transportation (arrow V) of the recording medium 14.

For the recording medium, any optically recordable means may be used. Ordinary light sensitive recording media may be used for this purpose. In addition, in another preferred embodiment, a recording medium capable of recording an incident optical image as a charge image may be used for a recording medium which can obtain a higher resolution. For the recording medium used in that case, ones using material such as silicon resin, polyester or the like may be used. In addition, tape-, disk- and sheet-like recording media, and other recording media having any configuration may be used as the recording medium 14.

To the image pickup device of the embodiment shown in FIG. 1, a signal processing function and/or a photoelectric conversion function may be added. For example, a scheme may be employed to deliver a single waveform light information emitted from the photo-to-photo conversion element PPCE in FIG. 1 to a signal processor through another half prism subsequent to the half prism 4 to convert thereat optical image information incident to the signal processor to an electric signal by a photoelectric converter (two-dimensional sensor, one-dimensional sensor, photodiode and the like may be selectively used for the photoelectric converter) to carry out various signal processing such as editing, trimming, light amplification, and the like by that electric signal (a signal processor constituted with controllable spatial modulating element, a reversible parallel memory, controllable parallel function element, controllable function coupling element and the like may be used as the signal processor, and an optical parallel signal processing may be implemented in the above-mentioned signal processor).

The recording and reproduction of the optical image information on the recording medium 14 may be conducted by the holograph. In that case, a coherent light used commonly at the time of the taking a picture of hologram and at the time of reproducing a wave front from the photo-charge conversion element PCCE is irradiated to the recording surface of the recording medium 14 to which optical image information is incident from the imaging lens 9. Thus, a hologram corresponding to the optical image of the object is formed and recorded on the recording surface of the recording medium 14.

The information having been recorded as a charge image on the recording medium 14 by the image pickup device of the embodiment shown in FIG. 1 may be electrostatically read out by allowing a needle-like electrode, a multiple needle-like electrode or the like to be in contact with the recording surface of the recording medium. Another approach may be employed to allow the dielectric mirror side of the information reading head of a structure comprising the transparent electrode, the optical modulation layer member, and the dielectric mirror to be in contact with the recording surface of the recording medium 14 to cause the reading light to be incident from the transparent electrode side of the information reading head. Thus, the light incident to the information reading head is passed via a route including the transparent electrode, the opto-modulation layer member, the dielectric mirror, the optical modulation layer member and the transparent electrode. Then, the light emitted for a second time from the transparent electrode of the information reading head is delivered to the analyzer, thus to reproduce it as an optical image having a light quantity pattern corresponding to a quantity of charges of the charge image of the recording surface of the recording medium 14, or to apply photoelectric conversion to the optical image obtained as stated above to provide an electric signal thus converted, and thereby to read it out as information having a high resolution.

The erasing operation applied to the photo-to-photo conversion element PPCE may be conducted by using a light emitted from the light source 10.

What is claimed is:

1. An image pickup device comprising:
   a photo-to-photo conversion element comprising at least a photoconductive layer member, a dielectric mirror, and an optical modulation layer member which are disposed between two transparent electrodes;
   a first image formation means for forming an optical image of an object on said photo-to-photo conversion element;
   a second image formation means for scanning, in two directions substantially perpendicular to each other, optical image information corresponding to said optical image of said object using a light beam and for forming the light beam reading out said optical image information into a scanning light beam, a scanning locus of which on a plane becomes a line; and
   recording medium transportation means for allowing a recording surface of a recording medium to be located on said plane where a linear image of said optical information is formed, and for continuously moving said recording medium in a direction having an angle with respect to said line of the scanning locus.

2. An image pickup device as set forth in claim 1, wherein said transportation means comprises a mechanism for continuously transporting said recording medium in the direction substantially perpendicular to said line of the scanning locus at a constant speed.

3. An image pickup device as set forth in claim 1, wherein said second image formation means comprises coherent light irradiation means for forming a hologram.

* * * * *